(12) United States Patent
Kishikawa et al.

(10) Patent No.: US 11,125,604 B2
(45) Date of Patent: Sep. 21, 2021

(54) COMBINATION WEIGHING DEVICE INCLUDING A MOVABLE AND DETACHABLE DISCHARGE CHUTE

(71) Applicant: Ishida Co., Ltd., Kyoto (JP)

(72) Inventors: Mikio Kishikawa, Ritto (JP); Naomi Imaaki, Ritto (JP)

(73) Assignee: Ishida Co., Ltd., Kyoto (JP)

( * ) Notice: Subject to any disclaimer, the term of this patent is extended or adjusted under 35 U.S.C. 154(b) by 157 days.

(21) Appl. No.: 16/479,876

(22) PCT Filed: Mar. 16, 2018

(86) PCT No.: PCT/JP2018/010450
§ 371 (c)(1),
(2) Date: Jul. 22, 2019

(87) PCT Pub. No.: WO2018/169047
PCT Pub. Date: Sep. 20, 2018

(65) Prior Publication Data
US 2021/0010851 A1   Jan. 14, 2021

(30) Foreign Application Priority Data

Mar. 17, 2017  (JP) .............................. JP2017-053609

(51) Int. Cl.
*G01G 13/16* (2006.01)
*G01G 19/387* (2006.01)
*G01G 21/28* (2006.01)

(52) U.S. Cl.
CPC ........... *G01G 13/16* (2013.01); *G01G 19/387* (2013.01); *G01G 21/28* (2013.01)

(58) Field of Classification Search
CPC .... G01G 13/16; G01G 19/387; G01G 19/393; G01G 21/28
See application file for complete search history.

(56) References Cited

U.S. PATENT DOCUMENTS 4,792,031 A   12/1988  Warner et al.
5,677,517 A *  10/1997  Berger ................... G01G 11/08
                                                      177/116

FOREIGN PATENT DOCUMENTS

CN       103963166 A    8/2014
CN       204018338 U   12/2014
(Continued)

OTHER PUBLICATIONS

Computer translation of JP 2009-019939 downloaded from the JPO website on Feb. 23, 2021.*

(Continued)

*Primary Examiner* — Randy W Gibson
(74) *Attorney, Agent, or Firm* — Studebaker & Brackett PC (57) ABSTRACT

A combination weighing apparatus includes a combination weighing unit configured to store articles supplied from outside into each of a plurality of weighing hoppers, to select a combination of measured values from a plurality of measured values of the articles corresponding to each of the weighing hoppers such that a total value results in a target measured value, and to cause the hoppers corresponding to the combination to discharge the articles, in which a discharge chute that receives the articles discharged from the combination weighing unit and that supplies the articles to a processing device for a subsequent process is provided, and the discharge chute is provided to be movable between a first position where the discharge chute receives the articles discharged from the combination weighing unit and a second position where the discharge chute is made to be detachable from a frame supporting the combination weighing unit.

9 Claims, 8 Drawing Sheets

(56) References Cited

FOREIGN PATENT DOCUMENTS

| | | |
|---|---|---|
| CN | 205561996 U | 9/2016 |
| JP | H06-014705 A | 1/1994 |
| JP | H08-166279 A | 6/1996 |
| JP | H10-019647 A | 1/1998 |
| JP | 2003-121248 A | 4/2003 |
| JP | 2003-287459 A | 10/2003 |
| JP | 2009-019939 A | 1/2009 |
| JP | 2009-092399 A | 4/2009 |
| JP | 2009-257976 A | 11/2009 |
| JP | 2016-136087 A | 7/2016 |
| JP | 2017-166976 A | 9/2017 |
| WO | 2012/056488 A1 | 5/2012 |
| WO | 2016/125407 A1 | 8/2016 |

OTHER PUBLICATIONS

Computer translation of JP 2009-257976 downloaded from the JPO website on Feb. 23, 2021.*

An Office Action; "Notice of Reasons for Refusal," mailed by the Japanese Patent Office dated Oct. 6, 2020, which corresponds to Japanese Patent Application No. 2017-053609 and is related to U.S. Appl. No. 16/479,876 with English language translation.

An Office Action issued by the China National Intellectual Property Administration dated Sep. 24, 2020, which corresponds to Chinese Patent Application No. 201880017002.8 and is related to U.S. Appl. No. 16/479,876 with English language translation.

International Search Report issued in PCT/JP2018/010450; dated Jun. 12, 2018.

Notification of Transmittal of Translation of the International Preliminary Report on Patentability (Chapter I) and Translation of Written Opinion of the International Searching Authority; PCT/JP2018/010450; dated Sep. 26, 2019.

The extended European search report issued by the European Patent Office dated Dec. 1, 2020, which corresponds to European Patent Application No. 18767969.1-1001 and is related to U.S. Appl. No. 16/479,876.

* cited by examiner

COMBINATION WEIGHING DEVICE INCLUDING A MOVABLE AND DETACHABLE DISCHARGE CHUTE

TECHNICAL FIELD

One aspect of the present invention relates to a combination weighing apparatus.

BACKGROUND ART

A combination weighing apparatus that measures weight values of articles thrown into each of a plurality of hoppers from the outside and performs combination weighing by using the measured weight values has been known. For example, the combination weighing apparatus in Patent Document 1 includes a distributing table that conveys supplied articles, pool hoppers that temporarily store therein the articles supplied from the distributing table, a plurality of weighing hoppers that weigh the articles, booster hoppers that temporarily store therein the articles weighed in the weighing hoppers, and a discharge chute that discharges the articles discharged from the combination-selected booster hoppers.

CITATION LIST

Patent Literature

Patent Document 1: Japanese Unexamined Patent Publication No. 2016-136087

SUMMARY OF INVENTION

Technical Problem

In such a combination weighing apparatus, when the articles are food or the like, cleaning is performed by removing the respective components such as the distributing table, the pool hoppers, the weighing hoppers, the booster hoppers, and the discharge chute. Above the discharge chute, however, the distributing table, the pool hoppers, the weighing hoppers, the booster hoppers, and the like are arranged. In addition, below the discharge chute, a bag-making and packaging machine is often arranged. Accordingly, even when desired to detach only the discharge chute, those components or devices need to be removed for that work, and thus the workability is poor.

Thus, an object of one aspect of the present invention is to provide a combination weighing apparatus capable of improving the workability of the work of attaching/detaching the discharge chute.

Solution to Problem

A combination weighing apparatus according to one aspect of the present invention is a combination weighing apparatus that includes a combination weighing unit configured to store articles supplied from outside into each of a plurality of hoppers, to select a combination of measured values from a plurality of measured values of the articles corresponding to each of the hoppers such that a total value results in a target measured value, and to cause the hoppers corresponding to the combination to discharge the articles, in which a discharge chute configured to receive the articles discharged from the combination weighing unit and to supply the articles to a processing device for a subsequent process is provided, and the discharge chute is provided to be movable between a first position where the discharge chute receives the articles discharged from the combination weighing unit and a second position where the discharge chute is made to be detachable from a frame supporting the combination weighing unit.

In the combination weighing apparatus of this configuration, the discharge chute can be detached by moving it with ease to the second position where an operator can easily access. Furthermore, the discharge chute can be attached from the second position where the operator can easily access. This makes it possible to improve the workability of the work of attaching/detaching the discharge chute.

In the combination weighing apparatus according to one aspect of the present invention, the frame is formed in a frame shape so as to surround the discharge chute in planar view as viewed from the vertical direction, the combination weighing apparatus further includes a rail member provided on the frame and extending in a horizontal direction and a support portion provided on the discharge chute and movable along the rail member, the discharge chute moves between the first position and the second position as the support portion slides on the rail member, and the support portion is arranged lower than a vertical-direction upper end portion of the discharge chute.

In the combination weighing apparatus of this configuration, the discharge chute can be made to be movable between the first position and the second position with a simple configuration. Furthermore, because the support portion is arranged lower than the vertical-direction upper end portion of the discharge chute, even if a dropout of a component or the like occurs when the support portion moves along the rail member, the relevant component or the like can be prevented from entering the discharge chute as a foreign matter.

In the combination weighing apparatus according to one aspect of the present invention, the discharge chute may be formed in a hollow cylindrical shape and the support portion may be arranged on an outer circumferential surface of the discharge chute. In the combination weighing apparatus of this configuration, even if a foreign matter appears when the support portion moves along the rail member, the relevant foreign matter can be prevented from being mixed in the hollow portion of the discharge chute.

In the combination weighing apparatus according to one aspect of the present invention, a movement restriction portion configured to restrict movement of the discharge chute along the rail member when the discharge chute is located at the first position may further be provided, and the discharge chute may be released from the restriction of movement by the movement restriction portion when receiving a second force that is greater than a minimum first force that enables the discharge chute to move along the rail member. In the combination weighing apparatus of this configuration, because the discharge chute can be fixed at the first position firmly and reliably, the articles supplied from the combination weighing unit can be reliably received. Furthermore, the movement restriction portion that restricts the discharge chute at the first position can be formed easily.

In the combination weighing apparatus according to one aspect of the present invention, the discharge chute may be provided with a handle, and the handle may be arranged lower than the vertical-direction upper end portion of the discharge chute. In the combination weighing apparatus of this configuration, the moving operation of the discharge chute is facilitated. Furthermore, because the handle is arranged lower than the vertical-direction upper end portion of the discharge chute, dust or the like that appears at the time of moving operation of the discharge chute can be prevented from entering the discharge chute as a foreign matter.

Advantageous Effects of Invention

According to one aspect of the present invention, the discharge chute can be detached easily.

DESCRIPTION OF EMBODIMENT

With reference to the accompanying drawings, the following describes an exemplary embodiment in detail. In the description of the drawings, identical or equivalent constituent elements are denoted by identical reference signs, and redundant explanations are omitted.

Figure 1:
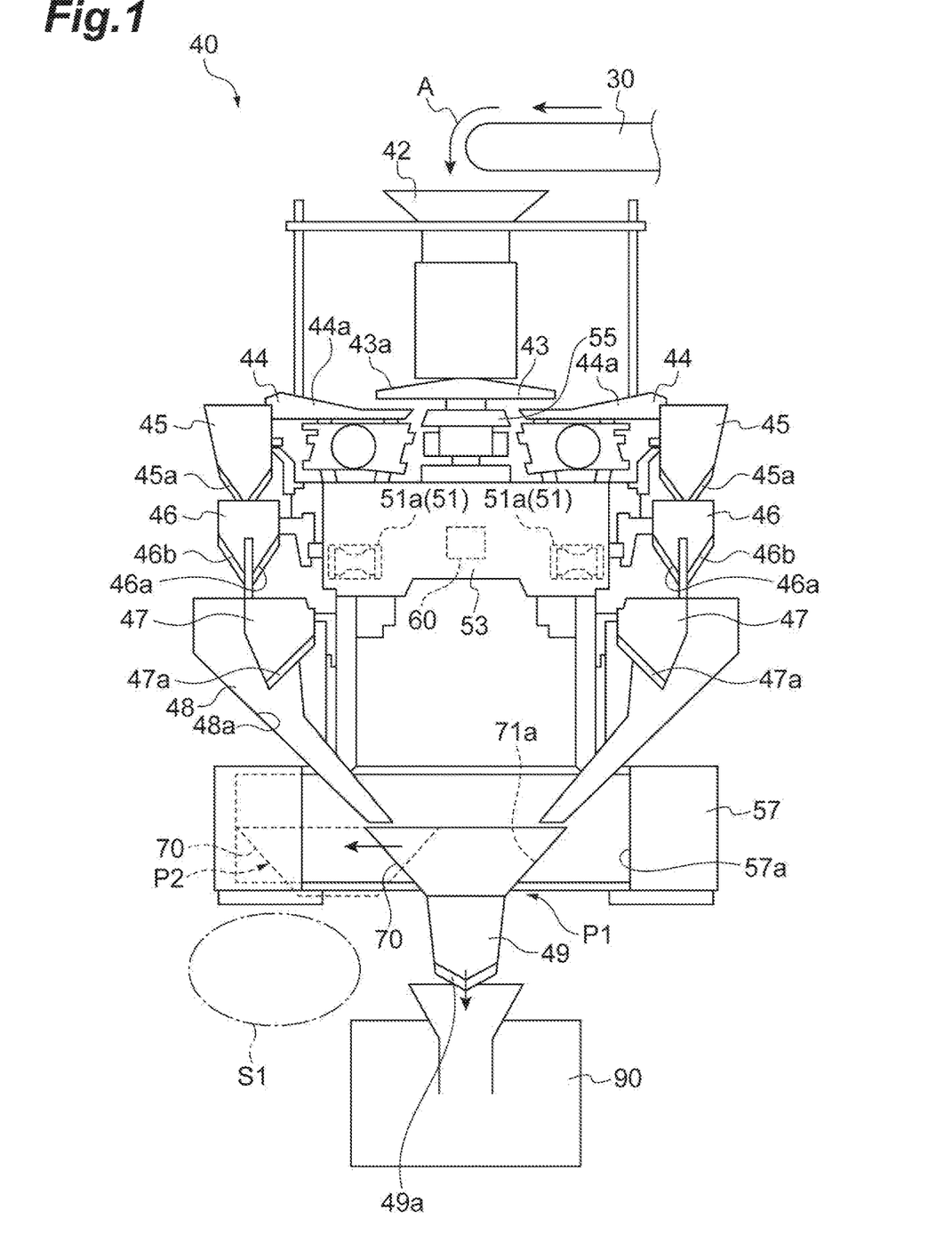
FIG. 1 is a diagram illustrating a configuration of a combination weighing apparatus according to one embodiment.
Figure 2:
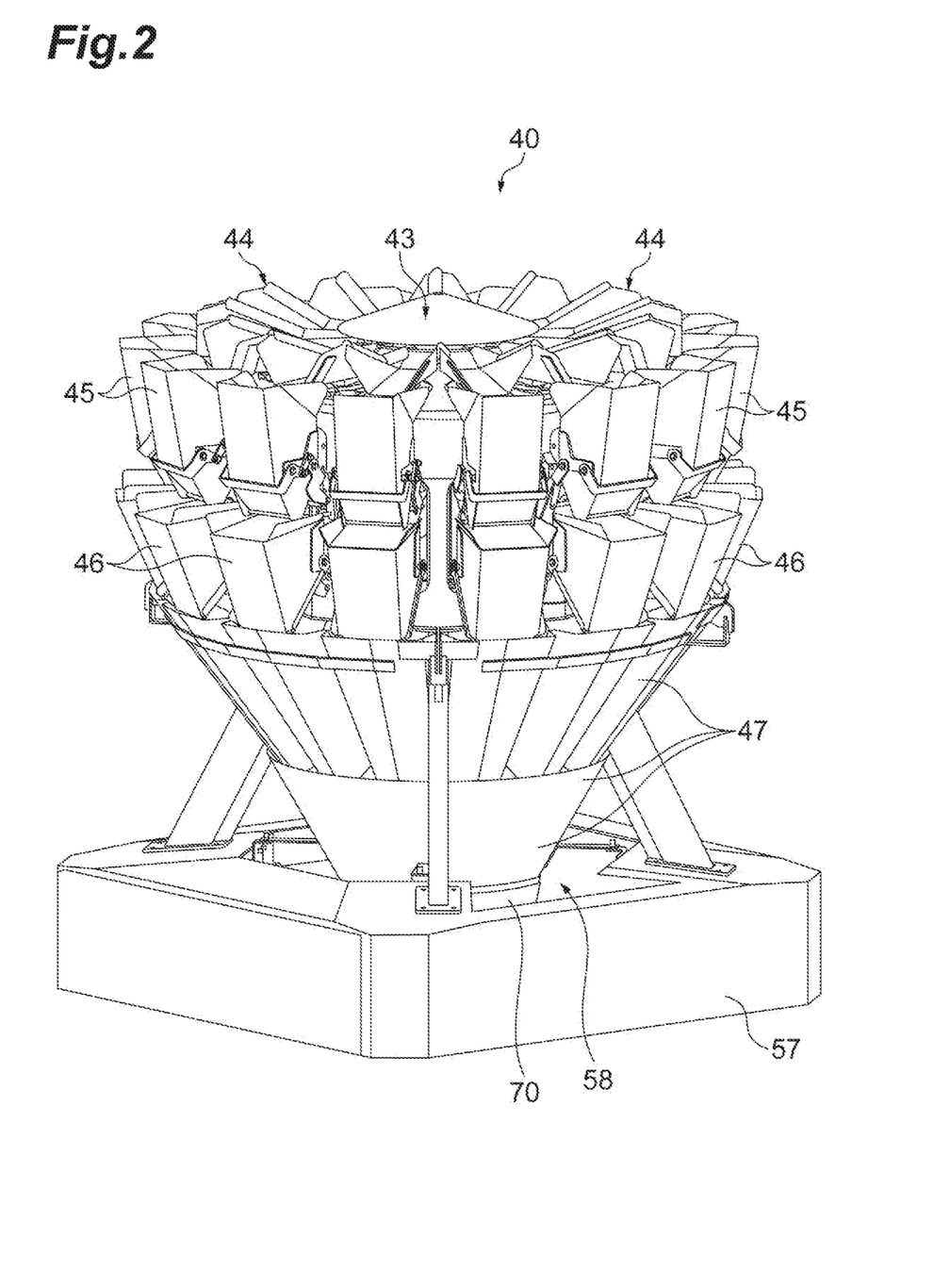
FIG. 2 is a perspective view of the combination weighing apparatus in FIG. 1.

As illustrated in FIG. 1 and FIG. 2, a combination weighing apparatus 40 includes an input chute 42, a distributing table 43, a plurality of radial feeders 44, a plurality of pool hoppers 45, a plurality of weighing hoppers 46, a plurality of booster hoppers 47, a collecting chute 48, a discharge chute 70, a timing hopper 49, a weighing unit 51, and a controller 60. The combination weighing apparatus 40 measures off articles A supplied by a conveying device 30 so as to obtain a target measured value, and supplies the articles A to a bag-making and packaging machine 90. The articles A are articles that have variations in single body mass such as agricultural products, fishery products, processed food, for example. The bag-making and packaging machine 90 packages the articles weighed and supplied by the combination weighing apparatus 40 while forming a film into a bag of a predetermined capacity.

The input chute 42 is arranged below a conveying end of the conveying device 30. The input chute 42 is a tubular member having a hollow portion for which openings are formed on the upper side and the lower side. In the hollow portion of the input chute 42, the articles A fallen from the conveying end of the conveying device 30 are thrown in. The articles A dropped into the hollow portion are discharged to the distributing table 43 via the opening at the lower side.

The distributing table 43 is arranged below the input chute 42. The distributing table 43 has a conveying surface 43a of a conical shape expanding downward. The distributing table 43 rotates the conveying surface 43a, thereby uniformly conveying the articles A discharged on an apex portion of the conveying surface 43a from the input chute 42 toward the outer edge of the conveying surface 43a.

A drive unit 55 rotates the distributing table 43 with the central portion of the distributing table 43 as a center. An example of the drive unit 55 is a motor. A drive unit 55 intermittently rotates the distributing table 43. That is, the distributing table 43 repeats rotation and stopping.

The radial feeders 44 are radially arranged along the outer edge of the conveying surface 43a that is a surface of the distributing table 43. Each radial feeder 44 has a trough 44a extending toward the outer edge from below the outer edge of the conveying surface 43a. Each radial feeder 44 vibrates the trough 44a, thereby conveying the articles A discharged from the outer edge of the conveying surface 43a toward a distal end portion of the trough 44a.

Each pool hopper 45 is arranged below the distal end portion of the trough 44a of the respective radial feeders 44. At the bottom portion of each pool hopper 45, provided is a gate 45a that can be opened and closed. Each pool hopper 45, in a state where the gate 45a is closed, temporarily stores therein the articles A discharged from the distal end portion of the trough 44a corresponding thereto, and by opening the gate 45a, discharges the temporarily stored articles A downward.

Each weighing hopper 46 is arranged below the gate 45a of the respective pool hoppers 45. At the bottom portion of each weighing hopper 46, provided are a gate 46a and a gate 46b that can be opened and closed. Each weighing hopper 46, in a state where the gate 46a and the gate 46b are closed, temporarily stores therein the articles A discharged from the pool hopper 45 corresponding thereto, and by opening the gate 46a or the gate 46b, discharges the temporarily stored articles A downward.

Each booster hopper 47 is arranged below the gate 46a of the respective weighing hoppers 46. At the bottom portion of each booster hopper 47, provided is a gate 47a that can be opened and closed. Each booster hopper 47, in a state where the gate 47a is closed, temporarily stores therein the articles A discharged from the gate 46a side of the weighing hopper 46 corresponding thereto, and by opening the gate 47a, discharges the temporarily stored articles A downward.

The collecting chute 48 is formed in a tubular shape having an inner circumferential surface 48a of a truncated cone tapering downward. The collecting chute 48 is arranged such that the inner circumferential surface 48a is located below all the weighing hoppers 46 and all the booster hoppers 47. The collecting chute 48 receives, on the inner circumferential surface 48a, the articles A discharged from the gate 46b side of the respective weighing hoppers 46 and the articles A discharged from the respective booster hoppers 47, and discharges the articles A downward.

The discharge chute 70 is formed in a tubular shape having an inner circumferential surface 71a of a truncated cone tapering downward. The discharge chute 70 is arranged such that the inner circumferential surface 71a is located below the collecting chute 48. The discharge chute 70 receives the articles A discharged from the collecting chute 48 on the inner circumferential surface 71a, and discharges the articles A downward. The detailed configuration of the discharge chute 70 will be described later.

The timing hopper 49 is arranged below the discharge chute 70. At the bottom portion of the timing hopper 49, provided is a gate 49a that can be opened and closed. The timing hopper 49, in a state where the gate 49a is closed, temporarily stores therein the articles A discharged from the discharge chute 70, and by opening the gate 49a, discharges the temporarily stored articles A to the bag-making and packaging machine 90.

The input chute 42, the distributing table 43, the radial feeders 44, the pool hoppers 45, and the weighing hoppers 46 are supported by a case 53 either directly or indirectly. The booster hoppers 47, the collecting chute 48, the discharge chute 70, and the timing hopper 49 are supported on a frame 57 either directly or indirectly. The configuration of the discharge chute 70 that supported by the frame 57 will be described in detail later.

The weighing unit 51 is arranged inside the case 53 that is supported by the frame 57. The weighing unit 51 has a plurality of load cells 51a. Each load cell 51a supports the weighing hopper 46 corresponding thereto. The weighing unit 51, when the articles A are temporarily stored in each weighing hopper 46, weighs a measured value corresponding to the mass of the relevant articles A.

The controller 60 is arranged inside the case 53. The controller 60 is a device that controls the various operations in the combination weighing apparatus 40, and is a signal processor that includes a central processing unit (CPU), a read only memory (ROM), and a random-access memory (RAM). The controller 60 controls the operations of various units of the combination weighing apparatus 40 such as the conveying operation of the distributing table 43 and each radial feeder 44, the opening and closing operation of the gate 45a of each pool hopper 45, the opening and closing operation of the gate 46a and the gate 46b of each weighing hopper 46, the opening and closing operation of the gate 47a of each booster hopper 47, and the gate 49a of each timing hopper 49.

The controller 60 stores the measured value weighed by the weighing unit 51, in association with the weighing hopper 46 and/or the booster hopper 47 in which the articles A corresponding to the relevant measured value are stored. Specifically, when the articles A weighed by the weighing unit 51 are stored in the weighing hopper 46, the controller 60 associates and stores the measured value weighed by the weighing unit 51 with the weighing hopper 46 in which the articles A corresponding to the relevant measured value are stored. When the articles A weighed by the weighing unit 51 are discharged to the booster hopper 47 corresponding to the relevant weighing hopper 46, the controller 60 associates and stores the measured value of the articles A weighed by the weighing unit 51 with the booster hopper 47 corresponding to the relevant weighing hopper 46.

The controller 60 selects a combination of measured values from a plurality of measured values that were weighed by the weighing unit 51 and respectively associated with the weighing hoppers 46 and/or the booster hoppers 47 such that a total value results in a target measured value. Specifically, the controller 60 selects the combination of measured values from the measured values output by the weighing unit 51 so that the total value falls within a predetermined range for which the target measured value is a lower limit value. Then, the controller 60 causes the weighing hoppers 46 and/or the booster hoppers 47 corresponding to the relevant combination to discharge the articles A.

Next, a support configuration of the discharge chute 70 provided on the frame 57 and the detailed configuration of the discharge chute 70 will be described with reference to FIG. 3 to FIG. 6.

Figure 3:
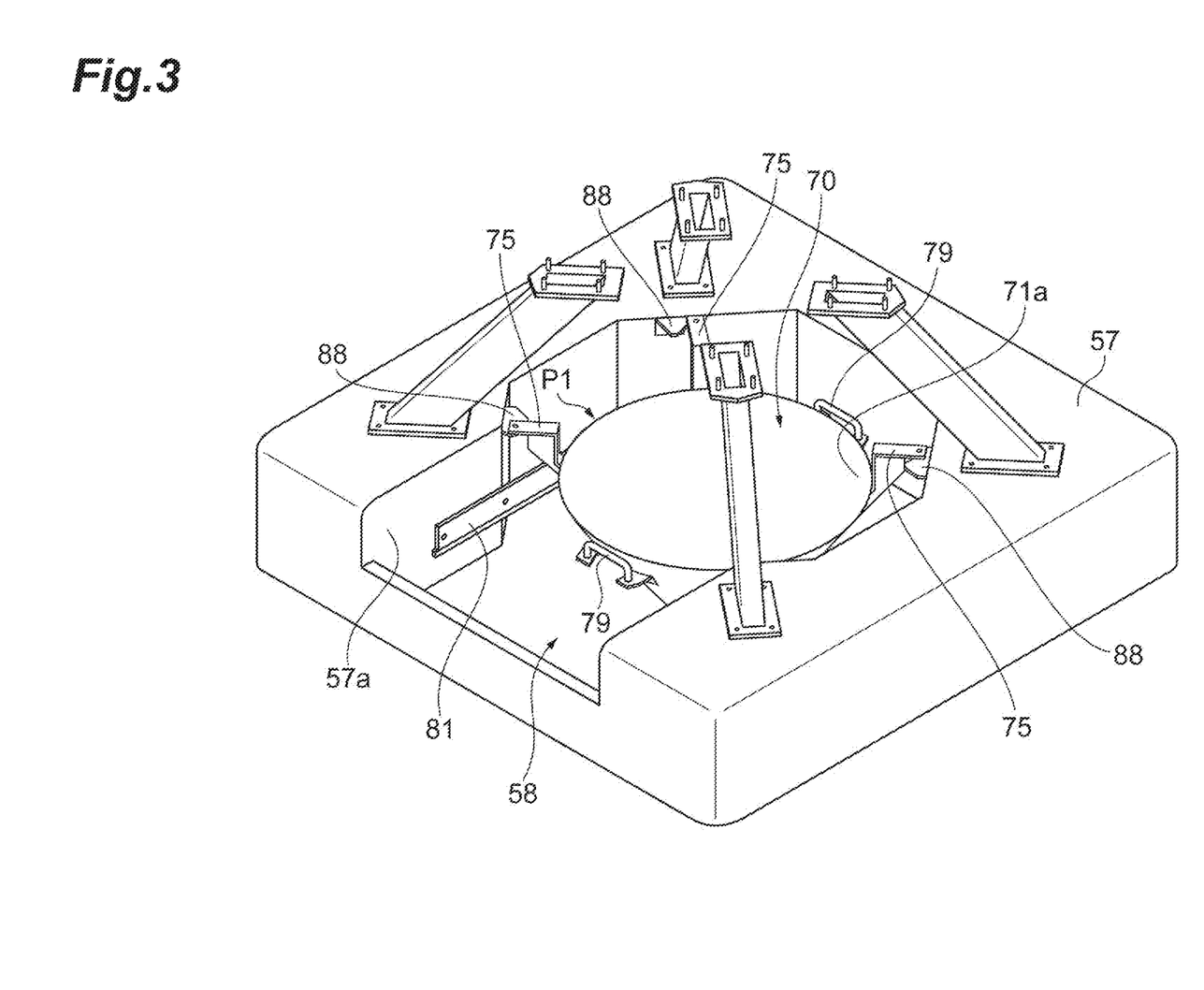
FIG. 3 is a perspective view of the vicinity of a frame when a discharge chute in FIG. 1 is at a fixed position.
Figure 4:
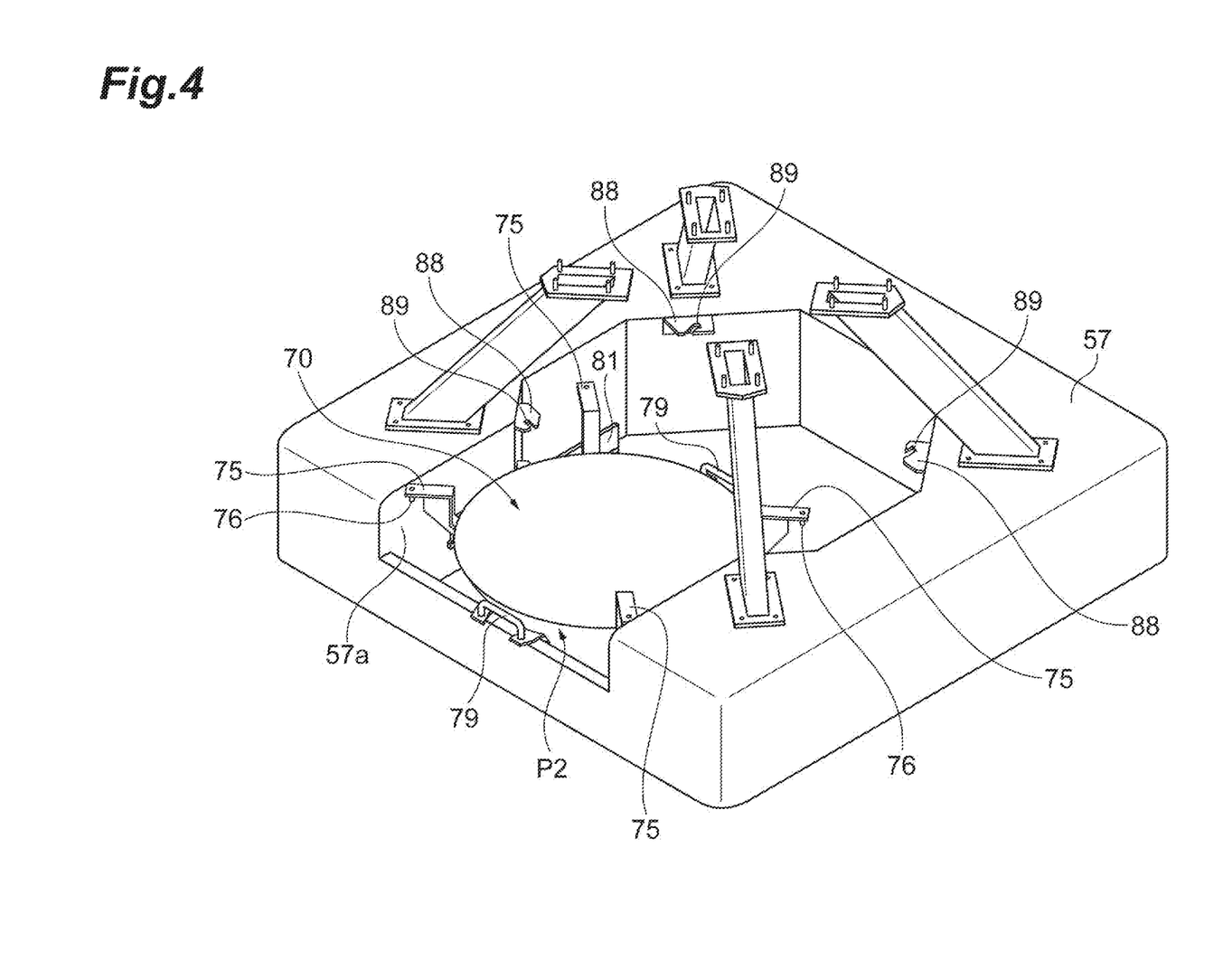
FIG. 4 is a perspective view of the vicinity of the frame when the discharge chute in FIG. 1 is at an attaching/detaching position.

The discharge chute 70 is provided to be movable between a first position P1 and a second position P2. At the first position P1, The discharge chute 70 receives the articles A for which the combination weighing is performed and discharged, the articles A being discharged from a combination weighing unit including, for example the pool hoppers 45, the weighing hoppers 46, the booster hoppers 47, and the collecting chute 48. At the second position P2, the discharge chute 70 is made to be detachable from the frame 57.

The frame 57 is formed in a frame shape so as to surround the discharge chute 70, in planar view as viewed from the vertical direction. As in the foregoing, the frame 57 directly or indirectly supports the combination weighing unit that performs the combination weighing such as the pool hoppers 45, the weighing hoppers 46, the booster hoppers 47, and the collecting chute 48. In an inner circumferential surface 57a of the frame 57, formed is a cutout portion 58 a part of which is in a recessed shape when viewed from the vertical direction. The thickness of the frame of the frame 57 in the portion where the cutout portion 58 is formed is thin as compared with the thickness of the frame on the other three sides. In the inner circumferential surface 57a of the frame 57, a pair of rail members 81 and 81 extending in the horizontal direction is fixed. The pair of rail members 81 and 81 supports rollers (supporting portions) 74 provided on the discharge chute 70 which will be described in detail later, and is formed such that the rollers 74 can roll.

Figure 5:
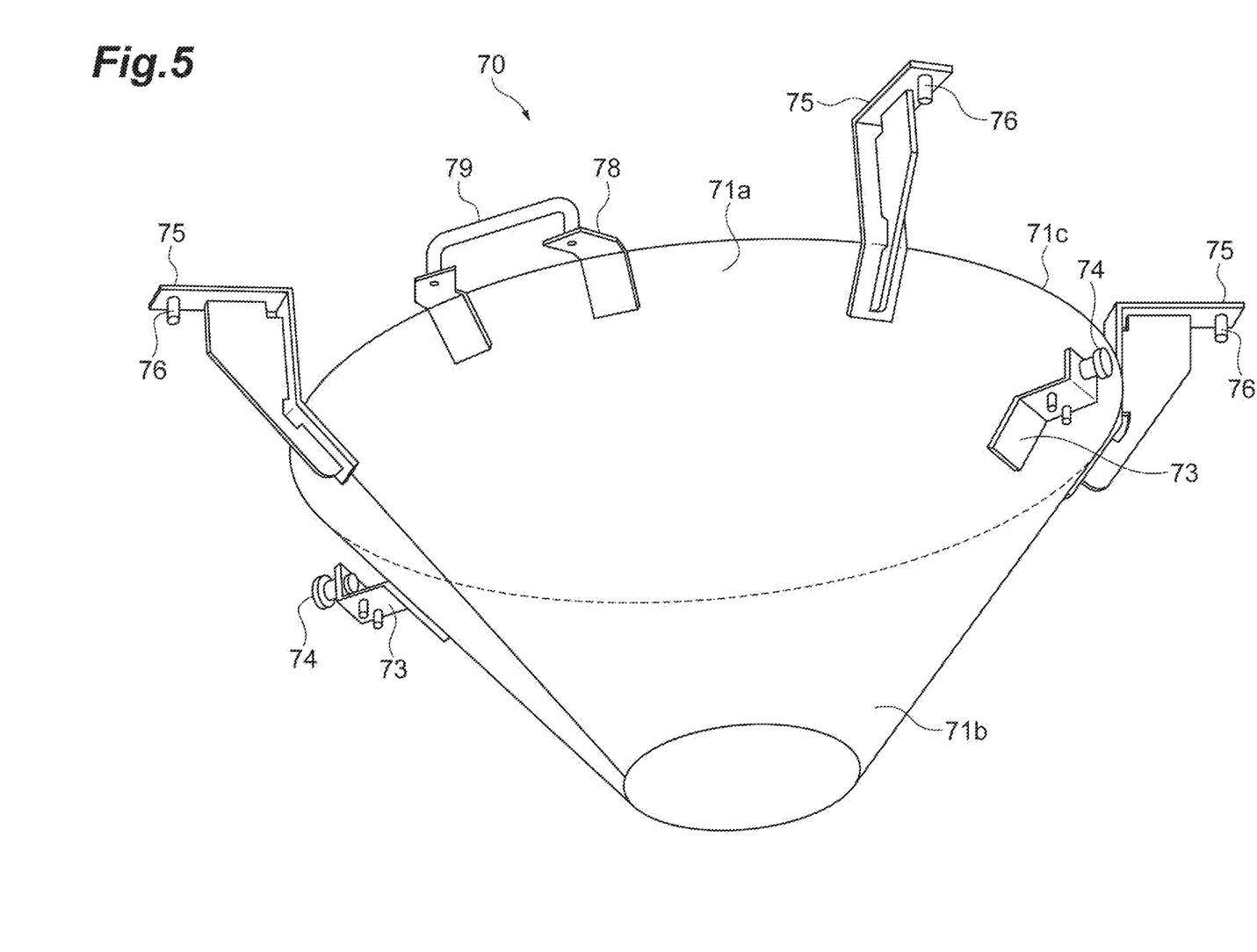
FIG. 5 is a perspective view of the discharge chute in FIG. 1 as viewed from an outer circumferential surface side.

The discharge chute 70 includes a pair of rollers 74 and 74, a plurality of (four) engaging portions 76, and a pair of handles 79. Each of the pair of rollers 74 is a cylindrical member capable of rolling on the pair of rail members 81 and 81. The roller 74 is attached via a bracket 73 provided on an outer circumferential surface 71b of the discharge chute 70. The engaging portions 76 are members capable of engaging with cutout portions 89 of engaged portions 88 provided on the inner circumferential surface 57a of the frame 57, and are one of members that fix the discharge chute 70 at the first position P1. The engaging portion 76 is attached via a bracket 75 provided on the outer circumferential surface 71b of the discharge chute 70.

Each of the pair of handles 79 is a member for an operator to grip when moving the discharge chute 70 between the first position P1 and the second position P2. The handle 79 is attached via brackets 78 provided on the outer circumferential surface 71b of the discharge chute 70.

The rail member 81 is a member that enables the discharge chute 70 to slide in the horizontal direction, and is fixed on the inner circumferential surface 57a of the frame. The rail member 81 includes a travel support portion 82 and a movement restriction portion 85. The travel support portion 82 extends in the horizontal direction and supports the roller 74 of the discharge chute 70 in a slidable manner. The movement restriction portion 85 is a place that restricts the movement of the discharge chute 70 along the rail member 81 when the roller 74 of the discharge chute 70 is located at the first position P1. The movement restriction portion 85 of the present embodiment is located lower than the travel support portion 82 in the travel support portion 82 extending in the horizontal direction. The movement restriction portion 85 has a tapered portion 85a connecting to the travel support portion 82. In the movement restriction portion 85, the tapered portion 85a is formed such that the discharge chute 70 is released from the restriction of movement when receiving a second force greater than a minimum first force that enables the discharge chute 70 to move along the travel support portion 82 of the rail member 81. As for the amount of downward offset of the movement restriction portion 85 with respect to the travel support portion 82, the shape and the size thereof are set in consideration of the weight and the size of the discharge chute 70 or of the ease of rolling of the roller 74 in the travel support portion 82.

Furthermore, the (four) engaging portions 76 provided on the discharge chute 70 are configured to engage, when the rollers 74 of the discharge chute 70 roll down the tapered portions 85a of the movement restriction portions 85 from the travel support portions 82, with the respective cutout portions 89 of the (four) engaged portions 88 provided on the frame 57. Thus, the movement of the rollers 74 of the discharge chute 70 in the horizontal direction is restricted, and the discharge chute 70 is positioned at the first position P1.

In the combination weighing apparatus 40 of the above-described embodiment, as illustrated in FIG. 1 and FIG. 4, the discharge chute 70 can be detached, by moving it with ease to the second position P2 where the operator can easily access. Furthermore, the discharge chute 70 can be attached from the second position P2 where the operator can easily access. This makes it possible to improve the workability of the work of attaching/detaching the discharge chute 70. In addition, because the bag-making and packaging machine 90 is not disposed in a space S1 below the second position P2 as in the case of below the first position P1, detaching work of the discharge chute 70 is facilitated. In planar view of the combination weighing apparatus 40 as viewed from the vertical direction, the second position P2 is a position outside of the first position P1. In other words, in planar view, the second position P2 is a position closer to the outer shape of the combination weighing apparatus 40 (for example, the outer shape of the frame 57) than the first position P1.

In the combination weighing apparatus 40 of the above-described embodiment, by the configuration in which the rollers 74 provided on the discharge chute 70 are made to roll along the rail members 81 provided on the frame 57, the discharge chute 70 is made to be movable with respect to the frame 57. As just described, in the combination weighing apparatus 40, the discharge chute 70 can be made to be movable between the first position P1 and the second position P2 with a simple configuration.

Figure 6:
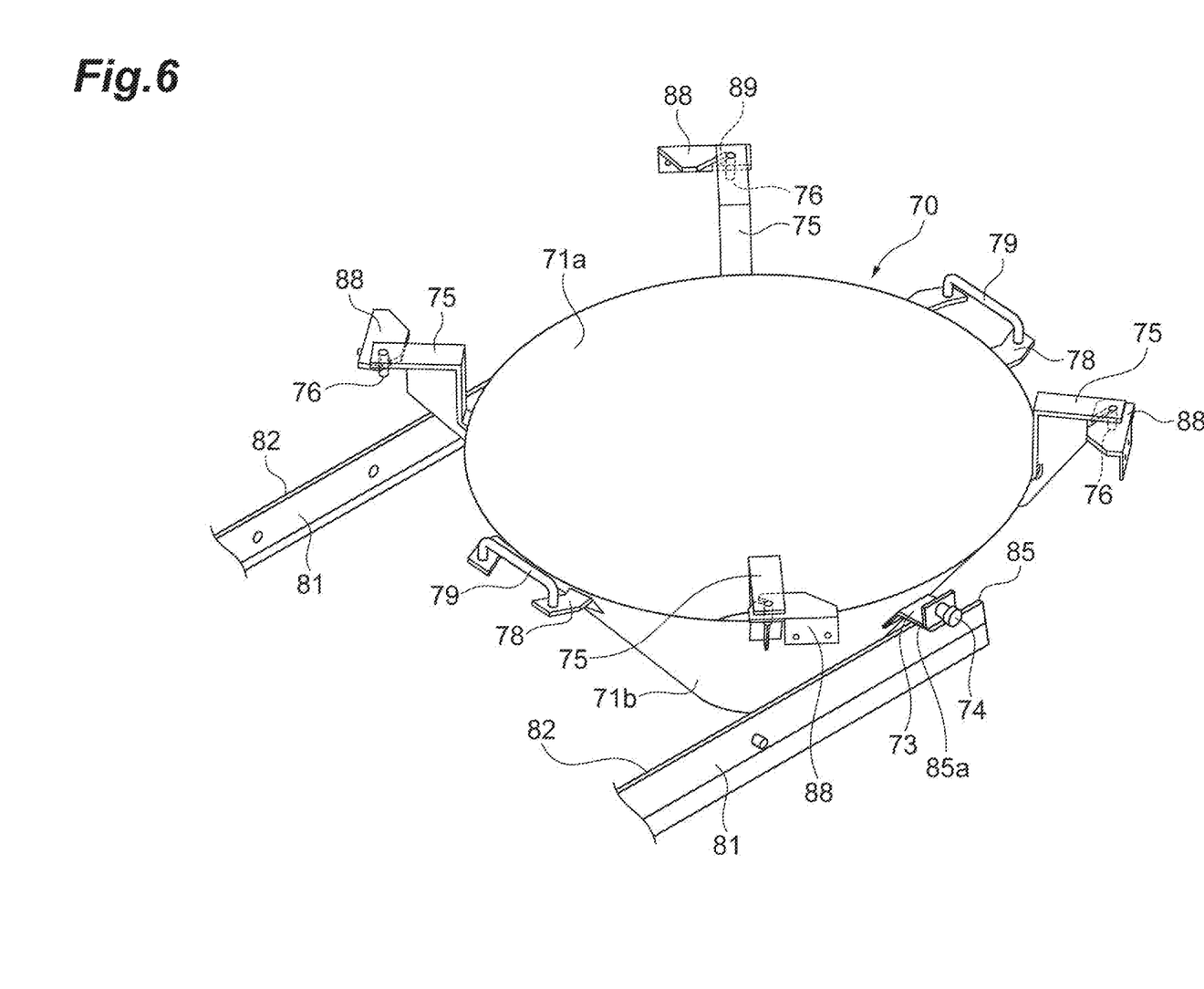
FIG. 6 is a plan view of rail members and the discharge chute illustrated in FIG. 3 and others as viewed obliquely from above.

As illustrated in FIG. 6, because the rollers 74 are disposed lower than a vertical-direction upper end portion 71c of the discharge chute 70, even if a dropout of a component occurs when the rollers 74 move along the rail members 81, the relevant component can be prevented from entering the discharge chute 70 as a foreign matter.

The discharge chute 70 is configured to be released from the restriction of movement by the movement restriction portion 85 only when receiving the second force that is greater than the minimum first force that enables the movement along the rail members 81. As a result, because the discharge chute 70 can be fixed at the first position P1 firmly and reliably, the articles A supplied from the combination weighing unit that performs combination weighing such as the pool hoppers 45, the weighing hoppers 46, the booster hoppers 47, and the collecting chute 48 can be reliably received. Furthermore, when positioning the discharge chute 70 at the above-described first position P1, by merely pushing it into the movement restriction portions 85, the rollers 74 slide down the tapered portions 85a, and the engaging portions 76 of the discharge chute 70 engage with the cutout portions 89 of the engaged portions 88 provided on the frame 57. Accordingly, with a simple operation, the discharge chute 70 can be positioned to the first position P1.

As illustrated in FIG. 5, because the discharge chute 70 is provided with the handles 79, the operator can easily perform a moving operation of the discharge chute 70.

Figure 7:
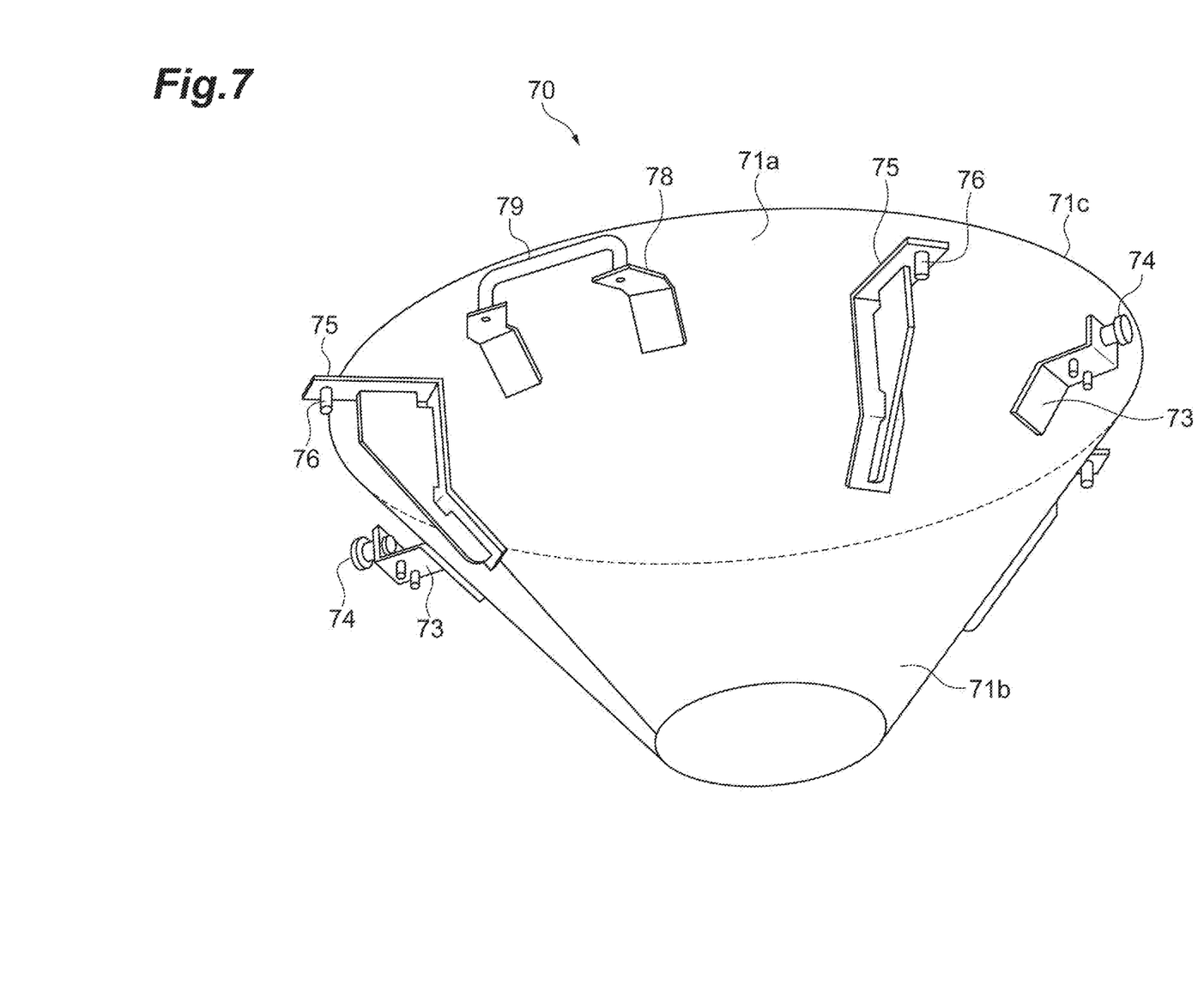
FIG. 7 is a perspective view of a discharge chute according to a modification as viewed from the outer circumferential surface side.

As in the foregoing, the above-described embodiment has been explained, but various modifications are possible. For example, as illustrated in FIG. 7, the engaging portions 76 and the handles 79 may be disposed lower than the vertical-direction upper end portion 71c of the discharge chute 70, and the arrangement of the engaged portions 88 provided on the frame 57 may also be changed to the location where it is possible to engage with the engaging portions 76 when the discharge chute 70 is located at the first position P1. In this case, even if a dropout of a component occurs when the rollers 74 move along the rail members 81, the relevant component can be prevented from entering the discharge chute 70 as a foreign matter. Furthermore, dust or the like that appears at the time of moving operation of the discharge chute 70 can be prevented from entering the discharge chute 70 as a foreign matter. Moreover, as a member to fix the discharge chute 70 at the first position P1, a bolt or the like may be used. At this time, it may be fixed to the frame 57 or the like by tightening the bolt upward from below in the vertical direction. In this case also, by arranging the bolt or the like lower than the vertical-direction upper end portion 71c of the discharge chute 70, the relevant bolt or the like can be prevented more reliably from entering the discharge chute 70 as a foreign matter.

Figure 8:
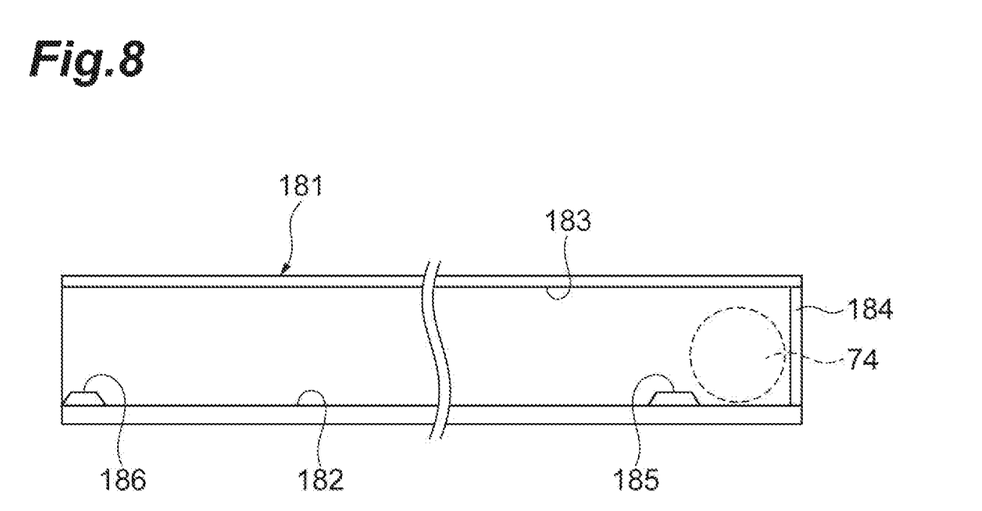
FIG. 8 is a front view of a rail member according to another modification as viewed from the front.

Furthermore, in place of the rail member 81 of the above-described embodiment, a rail member 181 as illustrated in FIG. 8 may be arranged. The rail member 181 includes a travel support portion 182, a first guide portion 183, a second guide portion 184, a first movement restriction portion (movement restriction portion) 185, and a second movement restriction portion 186. The travel support portion 182 extends in the horizontal direction and supports the roller 74 of the discharge chute 70 in a slidable manner. The first guide portion 183 is a member that restricts the movement of the roller 74 in the vertical direction, and stably moves the roller 74 in the horizontal direction. The second guide portion 184 is a member that restricts the movement of the roller 74 in the horizontal direction, and is one of members that fix the discharge chute 70 at the first position P1.

The first movement restriction portion 185 is a member that, when the discharge chute 70 is located at the first position P1, restricts the movement of the discharge chute 70 along the rail member 181. The first movement restriction portion 185 is formed such that the discharge chute 70 is released from the restriction of movement when receiving a second force greater than a minimum first force that enables the discharge chute 70 to move along the travel support portion 182 of the rail member 181. The first movement restriction portion 185 is a member of a projecting shape formed on the travel support portion 182, and in consideration of the weight and the size of the discharge chute 70 or of the ease of rolling of the roller 74 in the travel support portion 182, its shape, size, and the like are set.

The second movement restriction portion 186 is a member that, when the discharge chute 70 moves from the first position P1 to the second position P2, restricts the movement of the discharge chute 70 along the rail member 181. The second movement restriction portion 186 is formed such that the discharge chute 70 is allowed to further move in the horizontal direction when receiving a third force greater than the minimum first force that enables the discharge chute 70 to move along the travel support portion 182 of the rail member 181. In the second movement restriction portion 186 also, as with the first movement restriction portion 185, its shape, size, and the like are set, in consideration of the weight and the size of the discharge chute 70 or of the ease of rolling of the roller 74 in the travel support portion 182.

In the modification including the second movement restriction portion 186, the discharge chute 70 is configured to be released from the restriction of movement by the second movement restriction portion 186 only when receiving the third force that is greater than the minimum first force that enables the movement along the rail members 181. As a result, when moving the discharge chute 70 and moving it to the second position P2, a situation where the rollers 74 fall off from the rail members 181 unintentionally can be prevented.

REFERENCE SIGNS LIST

40 COMBINATION WEIGHING APPARATUS
57 FRAME
57a INNER CIRCUMFERENTIAL SURFACE
58 CUTOUT PORTION
70 DISCHARGE CHUTE
71a INNER CIRCUMFERENTIAL SURFACE
71b OUTER CIRCUMFERENTIAL SURFACE
71c VERTICAL-DIRECTION UPPER END PORTION
74 ROLLER
76 ENGAGING PORTION
79 HANDLE
81, 181 RAIL MEMBER
82, 182 TRAVEL SUPPORT PORTION
85 MOVEMENT RESTRICTION PORTION
90 BAG-MAKING AND PACKAGING MACHINE
185 FIRST MOVEMENT RESTRICTION PORTION (MOVEMENT RESTRICTION PORTION)
P1 FIRST POSITION
P2 SECOND POSITION
S1 SPACE

The invention claimed is:

1. A combination weighing apparatus including a combination weighing unit configured to store articles supplied from outside into each of a plurality of hoppers, to select a combination of measured values from a plurality of measured values of the articles corresponding to each of the hoppers such that a total value results in a target measured value, and to cause the hoppers corresponding to the combination to discharge the articles, the combination weighing apparatus comprising:
a discharge chute configured to receive the articles discharged from the combination weighing unit and to supply the articles to a processing device for a subsequent process, wherein the discharge chute is provided to be movable between a first position where the discharge chute receives the articles discharged from the combination weighing unit and a second position where the discharge chute is made to be detachable from a frame supporting the combination weighing unit, and the frame surrounds the discharge chute in planar view as viewed from a vertical direction;
a rail member provided on the frame and extending in a horizontal direction; and
a support portion provided on the discharge chute and movable along the rail member,
wherein the discharge chute is configured to move between the first position and the second position as the support portion slides on the rail member.

2. The combination weighing apparatus according to claim 1, wherein
the frame is formed in a frame shape, and
the support portion is arranged lower than a vertical-direction upper end portion of the discharge chute.

3. The combination weighing apparatus according to claim 2, wherein
the discharge chute is formed in a hollow cylindrical shape, and
the support portion is arranged on an outer circumferential surface of the discharge chute.

4. The combination weighing apparatus according to claim 2, further comprising:
a movement restriction portion configured to restrict movement of the discharge chute along the rail member when the discharge chute is located at the first position, wherein
the discharge chute is released from the restriction of movement by the movement restriction portion when receiving a second force that is greater than a minimum first force that enables the discharge chute to move along the rail member.

5. The combination weighing apparatus according to claim 1, wherein
the discharge chute is provided with a handle, and
the handle is arranged lower than a vertical-direction upper end portion of the discharge chute.

6. The combination weighing apparatus according to claim 3, further comprising:
a movement restriction portion configured to restrict movement of the discharge chute along the rail member when the discharge chute is located at the first position, wherein
the discharge chute is released from the restriction of movement by the movement restriction portion when receiving a second force that is greater than a minimum first force that enables the discharge chute to move along the rail member.

7. The combination weighing apparatus according to claim 2, wherein
the discharge chute is provided with a handle, and
the handle is arranged lower than a vertical-direction upper end portion of the discharge chute.

8. The combination weighing apparatus according to claim 3, wherein
the discharge chute is provided with a handle, and
the handle is arranged lower than a vertical-direction upper end portion of the discharge chute.

9. The combination weighing apparatus according to claim 4, wherein
the discharge chute is provided with a handle, and
the handle is arranged lower than a vertical-direction upper end portion of the discharge chute.

* * * * *